United States Patent Office 3,166,171
Patented Jan. 19, 1965

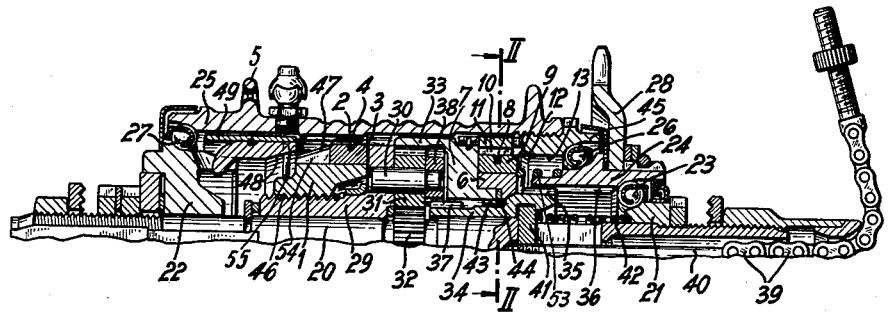
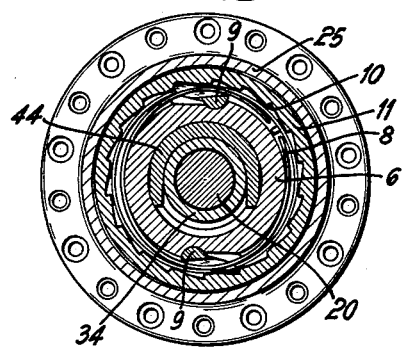
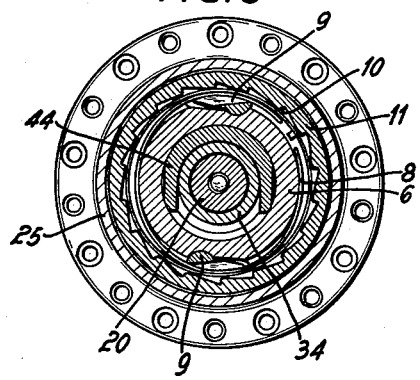
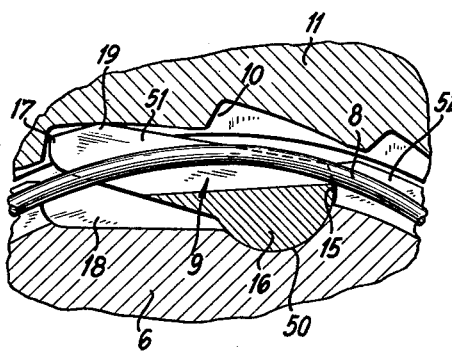
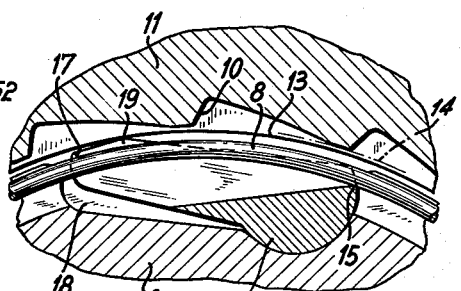
INVENTORS:
Hans-Joachim SCHWERDHÖFER
Richard GERSTNER

3,166,171
PAWL COUPLING
Hans Joachim Schwerdhöfer, Schweinfurt (Main), and Richard Gerstner, Schonungen, Germany, assignors to Fichtel & Sachs A.G., Schweinfurt (Main), Germany, a corporation of Germany
Filed May 2, 1962, Ser. No. 192,304
Claims priority, application Germany, May 5, 1961, F 33,847
5 Claims. (Cl. 192—64)

This invention relates to pawl couplings, and more particularly to a pawl coupling for selectively transmitting torque between elements of a bicycle hub and the like while the elements rotate relative to each other in one direction, the elements being free to rotate relative to each other in the opposite direction.

Pawl couplings rely on pawls mounted on a supporting carrier for pivotal movement about pivot axes spacedly parallel to the axis of rotation of the pawl carrier relative to a ratchet which is engaged by the pawls. In a bicycle hub, the space that would be required for mounting the pawls on the carrier by means of journals and annular bearings is not readily available, and it is usual to mount the pawls in pockets of the pawl carrier which prevent axial movement of the pawls. A spring retains the pawls in their pockets, and adequately secures them against undesired radial movement in known pawl couplings.

Accidental circumferential movement of the pawls from their normal positions is a source of malfunctioning in conventional couplings of this type. A pawl displaced from its pocket in a circumferential direction by vibration or by the normal operating stresses in the coupling is apt to wedge between the pawl carrier and the ratchet, and not only to make the bicycle inoperative until the pawl is removed from wedging engagement, but also to cause permanent damage to elements of the bicycle hub.

Pawl couplings have a particularly important function in multiple-speed bicycle hubs with or without coaster brakes, and the coupling of the invention will be disclosed hereinafter in its application to a multiple-speed coaster hub. It will be understood, though, that the invention is not limited to the specific application chosen as an example for the purpose of the disclosure.

The object of this invention is to provide a pawl coupling having particular utility in such multiple-speed hubs for bicycles and the like, and in free-wheeling bicycle hubs in general, and free from the shortcomings of known pawl couplings.

More particularly, the invention aims at a pawl coupling in which accidental circumferential movement of the pawls relative to the pawl carrier is safely prevented.

Another object is the provision of a pawl coupling the working elements of which are of such a shape as to be inexpensively manufactured to precise tolerances.

A further object is a pawl coupling in which wear of the working elements is distributed in such a manner as to provide long useful service of the coupling before replacement of pawls becomes necessary.

An additional object is a pawl coupling which occupies but a minimum of space and therefore lends itself to application in the rear wheel hub of a bicycle without crowding other hub elements.

With these and other objects in view, as will hereinafter more fully appear, and will be more particularly pointed out in the appended claims, reference is now made to the following description taken in connection with the accompanying drawing in which:

FIG. 1 shows a three-speed coaster hub for a bicycle equipped with two pawl couplings of the invention, one half of the hub being shown in axial section, the corresponding axial section of the non-illustrated half being substantially a mirror image of what is seen in FIG. 1;

FIG. 2 shows the hub of FIG. 1 in radial section on the line II—II;

FIG. 3 illustrates the device of FIG. 2 in a different operative position;

FIG. 4 shows a detail of FIG. 2 on an enlarged scale; and

FIG. 5 shows a detail of FIG. 3 on a larger scale.

Referring initially to FIG. 1, there is seen a coaster hub for a bicycle which will be described hereinafter only to the extent necessary for an understanding of this invention. All other elements of the hub are mounted on a shaft 20 which is normally fixedly mounted in the rear fork of a bicycle in the usual manner. Two internal bearing race members 21, 22 are fixedly mounted on respective axial end portions of the shaft 20. A set of bearing balls 23 rotatable on the bearing member 21 supports one axial end of a tubular driver member 24 fixedly secured to a drive sprocket 28. The sprocket which extends radially outward of the remainder of the hub structure is engaged by a driving chain of the bicycle in the normal operating condition of the hub.

A hub shell 25 which envelops most of the movable elements of the hub is of elongated tubular shape and has two flanges 5 to which wire spokes may be attached. A tubular outer bearing race member 45 is fixedly mounted in one axially terminal portion of the shell 25 and rotates on bearing balls 26 interposed between the outer bearing member 45 and the driver member 24. The other axially terminal portion of the hub shell 25 constitutes an outer bearing race for a set of bearing balls 27 which roll on the member 22.

Planetary gearing in the hub shell 25 provides three transmission ratios between the sprocket 28 and the hub shell 25. The gearing consists of a sun wheel 32 fixed on the shaft 20, a ring gear 33 integral with a flange 7 and coaxial with the shaft, and three planet wheels 31 of which one only is visible in the drawing. The planet wheels 31 simultaneously mesh with the sun wheel 32 and the ring gear 33. The planet wheels 31 are rotatable on a planet carrier 29 on respective pins 30. The planet carrier 29 is rotatably mounted on the shaft 20.

The planetary gearing is coupled to the driver member 24 by a coupling sleeve 34 movably mounted on the shaft 20. The sleeve is equipped with two external axially spaced toothed rims. A first rim 35 having axially elongated teeth engages internal axially elongated teeth 36 of the driver member 24 to ensure joint rotation of the driver member 24 and of the coupling sleeve 34 in any axial position of the latter. A second external toothed rim 37 of the sleeve 34 is seen in FIG. 1 to engage a toothed ring 38 fixedly secured to the planet carrier 29 by the pins 30.

The coupling sleeve 34 is axially movable on the shaft 20 by means of a speed changing mechanism which includes a link chain 39 connected to manual controls on the bicycle in a well-known manner, not further illustrated. The chain is attached to one end of a rod 40 which is axially slidable in a central cavity of the shaft 20. The other end of the rod 40 is secured to a sliding block 41 guided in a slot of the shaft 20 and radially projecting into a conforming recess of the coupling sleeve 34. A helical return spring 42 interposed between the bearing member 21 and the block 41 permanently urges the sleeve 34 to move away from the driver member 24 into the position illustrated in FIG. 1 in which further movement of the sleeve 34 is prevented by abutment of the block 41 against a portion of the shaft 20.

When tension applied to the chain 39 overcomes the force of the spring 42, the coupling sleeve 34 is axially moved toward the driver member 24 until its toothed rim 37 is disengaged from the ring 38 and engages an internal toothed rim 43 on a tubular axial extension of the flange 7. A U-shaped flat disc 44 is arranged movably astride the coupling sleeve 34. When the sleeve 34 moves from the position illustrated in FIG. 1 into a position of engagement of its toothed rim 37 with the internal rim 43 of the flange 7, the rim 37 axially abuts against the disc 44.

An annular pawl carrier 6 is mounted on an outer cylindrical face of the afore-mentioned extension of the flange 7. Conventional axially elongated ribs and recesses on opposite cylindrical faces of the extension and of the pawl carrier, not visible in the drawing, permit the carrier 6 to move axially on the extension, but prevent relative rotation. The pawl carrier 6 is an element of a pawl coupling according to this invention which is seen in more detail in the radially sectional views of FIGS. 2 to 5.

The outer cylindrical face of the pawl carrier 6 has two diametrically opposite grooves 18 which extend over the entire axial length of the carrier and are axially open. These grooves constitute pockets in each of which a pawl 9 is arranged. The pawls 9 cooperate with inclined alternating long and short face portions of an internal ratchet 10 on a rotatable ring 11 in a conventional manner. Axially projecting claws on the ring 11 and on the outer bearing race member 45 provide a coupling between the ring 11 and the hub shell 25 which permits relative axial movement without disengagement.

An integral hub portion of the planet carrier 29 has an outer cylindrical surface which carries flat threads 46 engaged with mating threads on a brake cone 1. A conical outer face 47 of the brake cone 1 is axially engageable with an inner conical face 48 on an axially slotted brake sleeve 49 which is secured against rotation relative to the shaft 20. Expansion of the sleeve 49 by axial engagement with the brake cone 1 forces the sleeve 49 into frictional braking engagement with an inner surface of the hub shell 25. A second pawl coupling connects the brake cone 1 to the hub shell 25. In this coupling, which is substantially identical in structure and operation with the afore-described coupling, the brake cone 1 constitutes the pawl carrier and its outer cylindrical face carries two pawls 3 which are urged into engagement with an internal ratchet 4 on the hub shell 25 by an annular wire spring 2. The details of this pawl coupling are identical with corresponding features of the coupling which transmits rotation in one direction only between the pawl carrier 6 and the ring 11, and will become more fully apparent when the last-mentioned pawl coupling will be further disclosed hereinafter.

As illustrated in FIG. 1, the planetary gearing is set for its highest speed. Driving torque is transmitted from the sprocket 28 to the hub shell 25 by means of the driver member 24, the coupling sleeve 34, the planet carrier 29, the planet wheels 31, the ring gear 33, the pawls 9, the ring 11, and the outer bearing race member 45.

When the sleeve 34 is moved into engagement of its toothed rim 37 with the internal toothed rim 43 of the ring gear 33 without displacing the disc 44, the internal power train of the hub is constituted by the driver member 24, the coupling sleeve 34, the ring gear 33, the pawls 9, the ring 11, and the outer bearing race member 45 in this order.

When the coupling sleeve 37 is moved further against the pressure of the spring 42, the toothed rims 37 and 43 remain engaged because of the axial length of their teeth, but the rim 37 axially displaces the disc 44 from the position shown in FIG. 1. The disc 44 is held in axial contact with a radial face of the pawl carrier by a spring 53 which tends to move the carrier 6 away from the driver member 24. The movement of the disc 44 as it is being entrained by the rim 37, axially moves the pawl carrier toward the outer bearing member 45 and into engagement of the pawls 9 with an annular conical face portion 12 of the bearing member, as better seen in FIGS. 2 to 5 wherein FIGS. 2 and 4 show radial views corresponding to FIG. 1, and FIGS. 3 and 5 show the position of the pawls 9 when engaged by the conical face portion 12. An axial end portion of a ridge 19 on the radially outer face of the pawl 9 abuts against the conical face portion 12 of the bearing member 45 during the axial movement of the pawl carrier, and the pawl is pivoted radially inward until it clears the ratchet 10 of the ring 11.

In the relative position of the hub elements described in the preceding paragraph, motion is transmitted from the sprocket 28 to the hub shell 25 by way of the driver member 24, the coupling sleeve 34, the ring gear 33, the planet wheels 31, the planet carrier 29, the brake cone 1, the pawls 3 and the ratchet 4. The angular movement of the hub shell 25 during each revolution of the sprocket 28 is at its lowest value.

The pawl coupling of the invention will now be described in more detail with particular reference to FIG. 4.

The pawl carrier pockets 18 are axially open grooves of uniform radial section and are readily formed by broaching, die-slotting or other simple operations. The depth of each pocket increases uniformly in a circumferential direction, but the deepest portion of the pocket is further recessed to form an axially elongated trough 50 of cylindrical shape.

The pawls 9 each have an inner portion shaped to conform to the contour of the corresponding pocket 18. The pawls are of elongated cross section in a radial plane. One of the longitudinal end portions of each pawl carries an integral projection 16 which is matingly received in the trough 50 of the pocket 18 so that the trough and projection jointly constitute a pivot for the pawl. The pawls are slotted in a common radial plane. The slot 51 of each pawl is open in a radially outward direction and in both circumferential directions in all operative positions of the pawl on the carrier 6.

A circumferential slot 52 in the carrier 6 is aligned with the slots 51 of the pawls 9. A wire spring 8 having the approximate shape of a broken circle engages the slots 51, 52 and secures the pawls against axial movement in the pocket 18. The spring resiliently abuts in a radial direction against an edge portion 15 of each pawl in the slot 51. This edge portion is circumferentially spaced from the axis of the cylindrical projection 16 so that the pressure of the spring 8 tends to pivot the outer portion of the pawl, including the slotted tip 17, outward of the pocket 18, and into a position of engagement with the internal ratchet 10 of the ring 11. The tips 17 are radially tapered as seen in FIGS. 2 to 5, and axially tapered as is seen in FIG. 1. Tangential or circumferential movement of the pawl 9 relative to the carrier 6 by the forces exerted by the ratchet 11 is securely prevented by the engagement of the projection 16 with the conforming cylindrical trough 50.

The face of the pawl 9 opposite the ratchet 10 has an axially elongated projecting ridge 19. When the ring 11 rotates faster than the pawl carrier 6, sliding contact between the spring loaded pawls 9 and the longer faces of the ratchet 10 is practically limited to the ridges 19. The tip 17 is always spaced from these faces. It is therefore almost entirely protected from moving contact with the ratchet, and from the concomitant wear.

When the pawl carrier 6 is shifted toward the sprocket 28 by the speed change mechanism acting on the disc 44 against the return springs 42 and 53, axial end portions of the ridges 19 engage a conically tapering abutment face 12 on the bearing member 45, and the pawls 9 are thereby retracted into their pockets 18 against the force of the spring 8 as seen in FIG. 5. The pawl carrier 6 with its pawls 9 may now axially enter a central bore 13 in the bearing member 45. The diameter of this bore is smaller than that of the hollow cylinder 14 defined by rotation of the ratchet 10, and the pawls cannot engage the ratchet.

The structure and function of the pawl coupling interposed between the brake cone 1 and the hub shell 25 are analogous to those of the coupling illustrated in FIGS. 2 to 5. More specifically, the brake cone 1 is formed with peripheral pockets 54 which extend over the entire axial length of the cone and intersect the conical face 47. The pawls 3 are pivoted on the brake cone 1 in respective pockets 54 by means of cylindrical projections and corresponding troughs in the brake cone 1. No provisions need be made for retraction of the pawls 3 into the corresponding pockets 54.

The ratchet 4 on the hub shell 25 has teeth of sufficient axial length to engage the pawls 4 during the axial movement of the brake cone 1 on the threads 46. Such movement is induced in a known manner by a spring 55 which is secured against axial movement in an annular groove of the brake cone 1. The spring is of approximately circular shape, rotatable in the groove about the axis of the shaft 20, and tensioned to frictionally engage the cone 1 during relative rotation. A free end portion of the spring 55 extends radially outward into an axial slot of the brake sleeve 49 so that the friction of the spring 55 impedes rotation of the brake cone 1 relative to the brake sleeve 49, and to the shaft 20 on which the sleeve 49 is secured against rotation.

The pawls 3, 9 may be identical in shape and dimensions, and are preferably manufactured from rods having the cross section evident from FIGS. 2 to 5. Pawls are made from such rods by transverse cutting. The cuts are of alternating depth so that a first cut will produce a slot 51, and the next cut will sever the slotted pawl 3, 9 from the remainder of the rod. When the pawls 9 are inserted in the carrier 6, the pressure of the spring 8 positions them in such a manner that the straight bottoms of the slots 51 extend along chords of the circle formed by the spring 8, and the tips 17 project radially beyond the cylinder 14. During assembly of the pawl carrier with the other elements of the hub, the pawls may be pushed back into their retracted position. When in place within the hub shell 25, they are urged by the pressure of the spring 8 into resilient engagement of their ridges 19 with the ratchet 10.

The pawl coupling of the invention is readily manufactured by relatively simple and inexpensive methods. It occupies very little space in the hub shell 25. The pawls 3, 9 do not require journals cooperating with annular bearings which complicate assembly and occupy valuable space. Yet, the pawls are secured relative to the supporting carrier against circumferential displacement, and are pivotable about respective fixed axes. Malfunctioning of the hub by circumferential displacement of the pawls, and wedging of the same between the pawl carrier and the cooperating ratchet member is safely avoided. Neither vibration nor the stresses inherent in power transmission can affect the positions of the pawls. The invention does not rely on walls of the pawl receiving pockets in the pawl carriers for axially securing the pawls, and the pockets may therefore be formed without axial walls, thereby greatly facilitating manufacture of the pawl carriers.

In the preferred embodiment of the pawl carrier illustrated in the drawing, the cylindrical projection 16 extends over only a portion of the radially inward face of each pawl 3, 9, and such a relatively small cylindrical projection is sufficient to provide the desired pivotal mounting of the pawl and a firm anchoring against circumferential stresses. If so desired, the projection 16 may be extended over the entire radially inward face of the corresponding pawl without changing the mode of operation of the coupling.

The useful life of a pawl coupling of the type described is normally determined by wear of the pawl tips 17. When these tips are rounded, they do not promptly engage the cooperating ratchet. The protection provided for the pawl tips against wear by the ridges 19 the dimensions of which are far less critical, thus materially extends the useful life of the coupling before replacement of pawls becomes necessary. The relatively broad ridges 19 also are better suited than the tips 17 to take the wear inherent in the retracting of the pawls 9 by axial contact with the conical face 12 of the bearing member 45.

It should be understood of course that the foregoing disclosure relates to only a preferred embodiment of the invention, and that it is intended to cover all changes and modifications of the example of the invention herein chosen for the purpose of the disclosure which do not constitute departures from the spirit and scope of the invention set forth in the appended claims.

What we claim is:

1. A pawl coupling for a bicycle hub and the like comprising, in combination:
   (a) a circular ratchet;
   (b) a pawl carrier rotatable relative to said ratchet in two directions in a radial plane about a common axis, said pawl carrier having a circumferential face portion opposite said ratchet, said face portion defining a radially open recess therein, at least a portion of said recess being cylindrical about a pivot axis transverse of said plane;
   (c) a pawl having an inner portion received in said recess and substantially conforming to said cylindrical portion thereof for pivoting movement about said pivot axis, and an outer portion engageable with said ratchet, said outer portion including
      (1) first abutment means circumferentially engageable with said ratchet when said pawl carrier rotates in one of said directions for transmitting torque between said pawl carrier and said ratchet, and
      (2) second abutment means radially engageable with said ratchet for sliding movement of said second abutment means relative to said ratchet, and for substantially preventing contact between said first abutment means and said ratchet when said pawl carrier rotates in the other direction; and
   (d) resilient means for urging said inner portion into conforming engagement with said cylindrical recess portion.

2. A pawl coupling as set forth in claim 1, wherein the recess defined by said face portion is of substantially uniform cross section transversely of said common axis, and extends in a direction parallel to said common axis; said pawl carrier is formed with a circumferentially elongated groove; and said resilient means includes elongated spring means retained in said groove and engaging said pawl for securing the same against movement in said recess parallel to said common axis and for urging said pawl into said conforming engagement of the inner portion thereof with said cylindrical recess portion.

3. A pawl coupling as set forth in claim 1, wherein said resilient means includes spring means for yieldably pivoting said pawl about said pivot axis into engagement of said outer portion thereof with said ratchet, said outer portion having a tip part constituting said first abutment means, and a ridge part circumferentially spaced from said tip part and constituting said second abutment means.

4. A pawl coupling as set forth in claim 1, further comprising third abutment means having a conically flaring annular abutment face about said common axis; and means for moving said pawl carrier and said third abutment means relative to each other in the direction of said common axis for axially abutting engagement of said abutment face with said pawl, said resilient means including spring means yieldably exerting pressure on said pawl for pivoting the same about said pivot axis into engagement of said outer portion thereof with said ratchet, said outer portion having a tip part constituting said first abutment means, and a ridge part axially projecting toward said abutment face beyond said tip part for engagement therewith during said relative movement of said pawl carrier and said abutment means in the direction of said common axis for pivoting said pawl against the pressure of said spring means out of engagement with said ratchet.

5. A pawl coupling as set forth in claim 1, wherein said ratchet has a plurality of circumferentially consecutive faces opposite said face portion of said pawl carrier, two consecutive ones of said faces constituting a pair, the faces of each pair being respectively longer and shorter in a circumferential direction, said resilient means including spring means for yieldably pivoting said pawl about said pivot axis into abutting engagement of said outer portion thereof with said ratchet, said outer portion having a tip part constituting said first abutment means and being circumferentially abuttable against said shorter ratchet faces when said pawl carrier rotates in said one direction, and a ridge part constituting said second abutment means, said ridge part being circumferentially spaced from said tip part and being radially abuttable against the longer ratchet faces for sliding movement of said ridge part relative to the latter ratchet faces when said pawl carrier rotates in said other direction, said tip part being spaced from each longer ratchet face while said ridge part radially abuts against the same.

References Cited by the Examiner

UNITED STATES PATENTS 2,895,576 7/59 Schwerdhofer.
2,988,186 6/61 Dotter _____ 192—64

FOREIGN PATENTS 997,737 9/51 France.
824,448 12/51 Germany.

DAVID J. WILLIAMOWSKY, *Primary Examiner.*